US011556504B2

(12) United States Patent
Xu et al.

(10) Patent No.: US 11,556,504 B2
(45) Date of Patent: Jan. 17, 2023

(54) FILE SHARING SERVICE CONTROLLER

(71) Applicant: CITRIX SYSTEMS, INC., Burlington, MA (US)

(72) Inventors: Ke Xu, Nanjing (CN); Zongpeng Qiao, Nanjing (CN); Jie Zhuang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 44 days.

(21) Appl. No.: 16/848,675

(22) Filed: Apr. 14, 2020

(65) Prior Publication Data

US 2021/0303520 A1 Sep. 30, 2021

Related U.S. Application Data

(63) Continuation of application No. PCT/CN2020/081600, filed on Mar. 27, 2020.

(51) Int. Cl.
| | |
|---|---|
| *G06F 16/176* | (2019.01) |
| *G06F 16/23* | (2019.01) |
| *G06F 16/22* | (2019.01) |
| *G06F 40/134* | (2020.01) |
| *G06F 16/16* | (2019.01) |
| *G06F 3/04842* | (2022.01) |
| *H04L 67/06* | (2022.01) |

(52) U.S. Cl.
CPC ........ *G06F 16/176* (2019.01); *G06F 3/04842* (2013.01); *G06F 16/168* (2019.01); *G06F 16/2282* (2019.01); *G06F 16/2365* (2019.01); *G06F 16/2379* (2019.01); *G06F 40/134* (2020.01); *H04L 67/06* (2013.01)

(58) Field of Classification Search
CPC .................................................. G06F 16/176
See application file for complete search history.

(56) References Cited

U.S. PATENT DOCUMENTS

2020/0167046 A1* 5/2020 Kirigin ................ G06F 3/0482
2020/0226194 A1* 7/2020 Zhou ................... G06F 16/9562

* cited by examiner

Primary Examiner — Van H Oberly

(57) ABSTRACT

A tracking engine may respond to a first user requesting to pin a link included in a message received from a second user by storing the link in a database table associated with the first user. Alternatively, if the first user requests to clone the link, the tracking engine may store the link in the database table as well as generate a local copy of a file associated with the link. The tracking engine may generate, based on the database table, a user interface for displaying, at a client associated with the first user, one or more links received by the first user. The tracking engine may update the database table to mark or remove invalid links. As such, the user interface that is generated based on the database table may exclude invalid links or include unselectable user interface elements for the invalid links.

17 Claims, 7 Drawing Sheets

| File ID | File Name | File Size | Upload Date | Creator | Validity Period | Link Sender |
|---|---|---|---|---|---|---|
| 1 | A.doc | 547KB | 11/22/19 | ZQ | 30 | XK |
| 2 | B.doc | 163KB | 11/21/19 | XF | 25 | XK |
| ... | ... | ... | ... | ... | ... | ... |

FIG. 2A

FILE SHARING SERVICE CONTROLLER

CROSS REFERENCE TO RELATED APPLICATIONS

This application is a continuation application of International Application No. PCT/CN2020/081600, filed Mar. 27, 2020 and entitled "FILE SHARING SERVICE CONTROLLER," the contents of which are hereby incorporated by reference in their entirety.

TECHNICAL FIELD

The subject matter described herein relates generally to cloud-based file sharing and more specifically to the tracking of links to content managed by a cloud-based file sharing service.

BACKGROUND

A cloud-based file sharing service may provide access to a variety of digital content including, for example, computer programs, multimedia files, electronic documents, and/or the like. For example, the digital content may be uploaded to the cloud-based file sharing service such that one or more users may access the digital content stored at the cloud-based file sharing service. Alternatively and/or additionally, a user may host the digital content locally, for example, in a dedicated sharing directory, in which case the cloud-based file sharing service may provide a portal for other users to access the digital content at the first client.

SUMMARY

Systems, methods, and articles of manufacture, including computer program items, are provided for tracking linked content from a cloud-based file sharing service. In one aspect, there is provided a system. The system may include at least one data processor and at least one memory. The at least one memory may store instructions which, when executed by the at least one data processor cause the at least one data processor to at least: in response to a first user receiving, from a second user, a message including a first link to a first file associated with a file sharing service, generate a first user interface including a first user interface element for pinning the first link; in response to the first user requesting to pin the first link by selecting the first user interface element, store, in a database table associated with the first user, the first link; and generate, based at least on the database table, a second user interface configured to display, at a client associated with the first user, one or more links received by the first user.

In some variations, one or more features disclosed herein including the following features can optionally be included in any feasible combination. The first user interface may further include a second user interface element for cloning the first link. The first link may be stored in the database table associated with the first user in response to the first user requesting to clone the first link by selecting the second user interface element.

In some variations, in response to the first user requesting to clone the first link, a local copy of the first file may be generated at the first client associated with the first user including by downloading, from the file sharing service, the first file and storing the first file at the client. The local copy of the first file may be accessed in response to the first user selecting the first link displayed as part of the second user interface.

In some variations, storing the first link in the database table may include storing, in the database table, an identifier of the first file, a name of the first file, a size of the first file, a date the first file was uploaded to the file sharing service, a creator of the first file, and a validity period during which the first link, and/or a sender of the first link.

In some variations, the database table may be traversed to determine a validity of one or more links included in the database table. The database table may be updated in response to determining that a second link included in the database table is invalid. The update may include setting an indicator to indicate that the second link is invalid or removing the second link from the database table.

In some variations, the second link may be determined to be invalid based at least on an expiration of a validity period associated with the second link.

In some variations, the second link may be determined to be invalid based at least on a second file associated with the second link being unavailable at a location associated with the second link.

In some variations, the one or more links displayed as part of the second user interface may include the first link based at least on the first link being valid. The second user interface may include an user interface element corresponding to the first link. The first file may be accessed by selecting the user interface element.

In some variations, the one or more links displayed as part of the second user interface may exclude the second link based at least on the second link being invalid.

In some variations, the one or more links displayed as part of the second user interface may include the second link. The second user interface may include an unselectable user interface element corresponding to the second link based at least on the second link being invalid.

In some variations, the second user interface may be generated in response to the first user accessing a directory. The one or more links received by the first user may be displayed as part of the directory.

In another aspect, there is provided a method for tracking linked content from a cloud-based file sharing service. The method may include: in response to a first user receiving, from a second user, a message including a first link to a first file associated with a file sharing service, generating a first user interface including a first user interface element for pinning the first link; in response to the first user requesting to pin the first link by selecting the first user interface element, storing, in a database table associated with the first user, the first link; and generating, based at least on the database table, a second user interface configured to display, at a client associated with the first user, one or more links received by the first user.

In some variations, one or more features disclosed herein including the following features can optionally be included in any feasible combination. The first user interface may further include a second user interface element for cloning the first link. The first link is stored may be the database table associated with the first user in response to the first user requesting to clone the first link by selecting the second user interface element.

In some variations, the method may further include: in response to the first user requesting to clone the first link, generating, at the client associated with the first user, a local copy of the first file including by downloading, from the file sharing service, the first file and storing the first file at the client; and in response to the first user selecting the first link displayed as part of the second user interface, accessing the local copy of the first file.

In some variations, the method may further include: traversing the database table to determine a validity of one or more links included in the database table; and updating the database table in response to determining that a second link included in the database table is invalid, the update includes setting an indicator to indicate that the second link is invalid or removing the second link from the database table.

In some variations, the second link may be determined to be invalid based at least on an expiration of a validity period associated with the second link and/or a second file associated with the second link being unavailable at a location associated with the second link.

In some variations, the one or more links displayed as part of the second user interface may exclude the second link based at least on the second link being invalid.

In some variations, the one or more links displayed as part of the second user interface may include the second link. The second user interface may include an unselectable user interface element corresponding to the second link based at least on the second link being invalid.

In another aspect, there is provided a non-transitory computer readable medium storing instructions. The instructions may cause operations may executed by at least one data processor. The operations may include: in response to a first user receiving, from a second user, a message including a link to a file associated with a file sharing service, generating a first user interface including a user interface element for pinning the link; in response to the first user requesting to pin the link by selecting the user interface element, storing, in a database table associated with the first user, the link; and generating, based at least on the database table, a second user interface configured to display, at a client associated with the first user, one or more links received by the first user.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to tracking linked content from a cloud-based file sharing service, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A depicts an example of a database table for tracking linked content from a file sharing service, in accordance with some example embodiments;

When practical, similar reference numbers denote similar structures, features, or elements.

DETAILED DESCRIPTION

Figure 1:
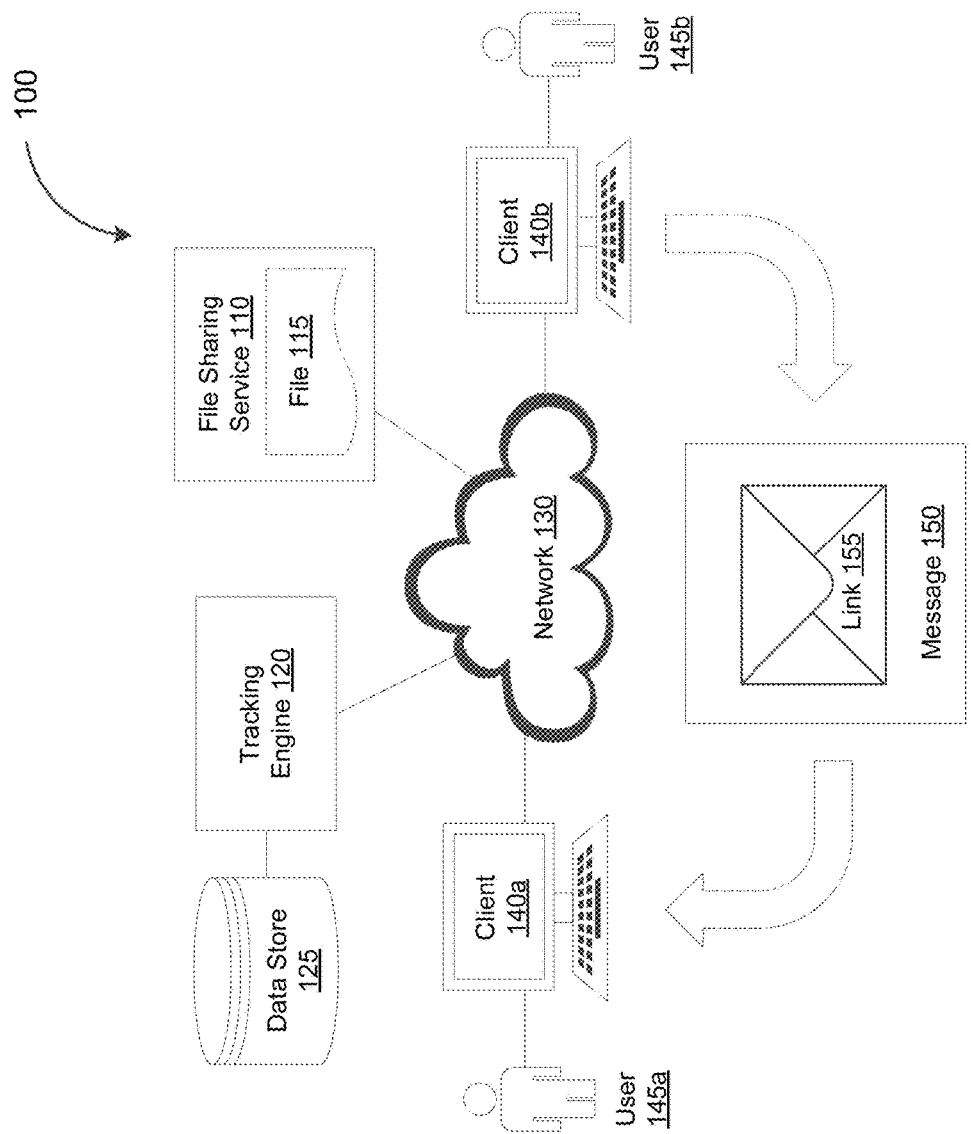
FIG. 1 depicts a system diagram illustrating an example of a file sharing system, in accordance with some example embodiments.

A cloud-based file sharing service may provide access to a variety of digital content, which may include digital content stored at a repository associated with the cloud-based file sharing service as well as digital content hosted remotely, for example, at a repository associated with one or more clients of the cloud-based file sharing service. A first user may receive, from a second user, a message (e.g., an email, an instant message, an issue tracking ticket, and/or the like) including a link to one or more files from the cloud-based file sharing service. Although the one or more files may be accessible to the first user for a quantity of time specified by the second user, the first user may lose track of the message containing the link and thus lose the ability to access the one or more files.

As such, in some example embodiments, a tracking engine may be configured to track the sharing of linked content from a file sharing service. For example, the tracking engine may track the links received by the first user including by storing, in a database table associated with the first user, the links received by the first user. In response to the first user accessing a directory designated for linked content, the tracking engine may be configured to populate, based at least on the database table associated with the first user, the directory with files that are associated with the links received by the first user. For instance, the directory, which may be displayed as part of a graphic user interface at a client associated with the first user, may include the one or more files associated with the link that the first user received from the second user.

In some example embodiments, the tracking engine may be configured to update the database table associated with the first user to indicate and/or remove one or more invalid links. For example, the link the first user received from the second user may be valid during a validity period, which may be a quantity of time specified by the second user. That is, the link received from the second user may become invalid outside of the validity period specified by the second user. Alternatively and/or additionally, the link received from the second user may become invalid if the one or more files associated with the link are no longer available at the location associated with the link. Accordingly, as part of updating the database table, the tracking engine may indicate the link received from the second user as invalid, for example, by setting an indicator (e.g., a Boolean value and/or the like). For instance, the indicator may be set to a first value if the link is valid or a second value if the link is invalid. Alternatively, the tracking engine may update the database table by removing, from the database table, the link received from the second user if the tracking engine determines that the link is invalid. When the first user subsequently accesses the directory, the directory that is displayed at the client associated with the first user may exclude files associated with invalid links such as, for example, the one or more files associated with the link received from the second user.

In some example embodiments, in addition to tracking the links received by the first user by storing the links received by the first user, the tracking engine may further generate, at the client associated with the first user, a local copy of the one or more files associated with the link received from the first user. For example, in response to an indication from the first user to copy the one or more files associated with the link received from the second user, the tracking engine may download, from the cloud-based file sharing service, the one or more files. A local copy of the one or more files may be stored at the client associated with the first user. When the first user accesses the directory designated for linked content, the tracking engine may populate the directory to include the one or more files associated with the link received from the second user. However, instead of accessing the one or more files remotely via the cloud-based file sharing service, the first user may be able to access the local copy of the one or more files stored at the client associated with the first user. Moreover, the tracking engine may remove, from the client associated with the first user, the local copy of the one or more files when the link associated with the one or more files is invalid, for example, outside of the validity period specified by the second user.

FIG. 1 depicts a system diagram illustrating an example of a file sharing system 100, in accordance with some example embodiments. Referring to FIG. 1, the file sharing system 100 may include a file sharing service 110 and a tracking engine 120. The file sharing service 110 and the tracking engine 120 may be communicatively coupled, vi a network 130, with one or more clients including, for example, a first client 140a, a second client 140b, and/or the like. The network 130 may be a wired network and/or a wireless network including, for example, a local area network (LAN), a virtual local area network (VLAN), a wide area network (WAN), a public land mobile network (PLMN), the Internet, and/or the like. The first client 140a and the second client 140b may be processor-based devices including, for example, a smartphone, a tablet computer, a wearable apparatus, a laptop computer, a desktop computer, a workstation, and/or the like.

Referring again to FIG. 1, the file sharing service 110 may provide access to a variety of digital content including, for example, a file 115. For example, a first user 145a at the first client 140a may receive, from a second user 145b at the second client 140b, a message 150 including a link 155 to the file 115. By sending the link 155 to the first user 145a at the first client 140a, the second user 140b may enable the first user 145a to select the link 155 to access, via the file sharing service 110, the file 115. It should be appreciated that the file 115 may be stored at a repository associated with the file sharing service 110 or at a repository associated with the second client 140b. The link 155 may direct the first client 140a to the file sharing service 110, which may respond by at least routing the first client 140a to the location at which the file 115 is stored.

Although the file 115 may be accessible to the first user 145a for a quantity of time (e.g., an n number of days, a start date, an expiration date, and/or the like) specified by the second user 145b, the first user 145a may lose track of the message 150 containing the link 155 and thus lose the ability to access the file 115 associated with the link 155. Accordingly, in some example embodiments, the tracking engine 120 may be configured to track the sharing of linked content from the file sharing service 110 including, for example, the file 115 and the corresponding link 155. For example, in response to the first user 145a receiving the message 150 including the link 155, the tracking engine 120 may track the link 155 including by storing, in a database table associated with the first user 145a, the link 155. A repository associated with the tracking engine 120, for example, the data store 125 shown in FIG. 1, may be configured to store the database table associated with the first user 145a as well as other users associated with the file sharing service 110.

To further illustrate, FIG. 2A depicts an example of a database table 200 for tracking linked content from the file sharing service 110, in accordance with some example embodiments. Referring to FIGS. 1 and 2A, the tracking engine 120 may respond to the first user 145a receiving the message 150 including the link 155 by at least storing, in the database table 200 stored in the data store 125, the link 155. The database table 200 may be associated with the first user 145a and may therefore store a variety of links sent to the first user 145a including the link 155 received from the second user 145b as well as other links received from the second user 145b and/or other users. As shown in FIG. 2A, storing the link 155 in the database table 200 may include storing a variety of information associated with the link 155 and the file 115 associated with the link 155 including, for example, an identifier of the file 115, a name of the file 115, a size of the file 115, a date the file 115 was uploaded to the file sharing service 110, a creator of the file 115, a validity period during which the link 155 is valid, a sender of the link 155, and/or the like.

Figure 2B:
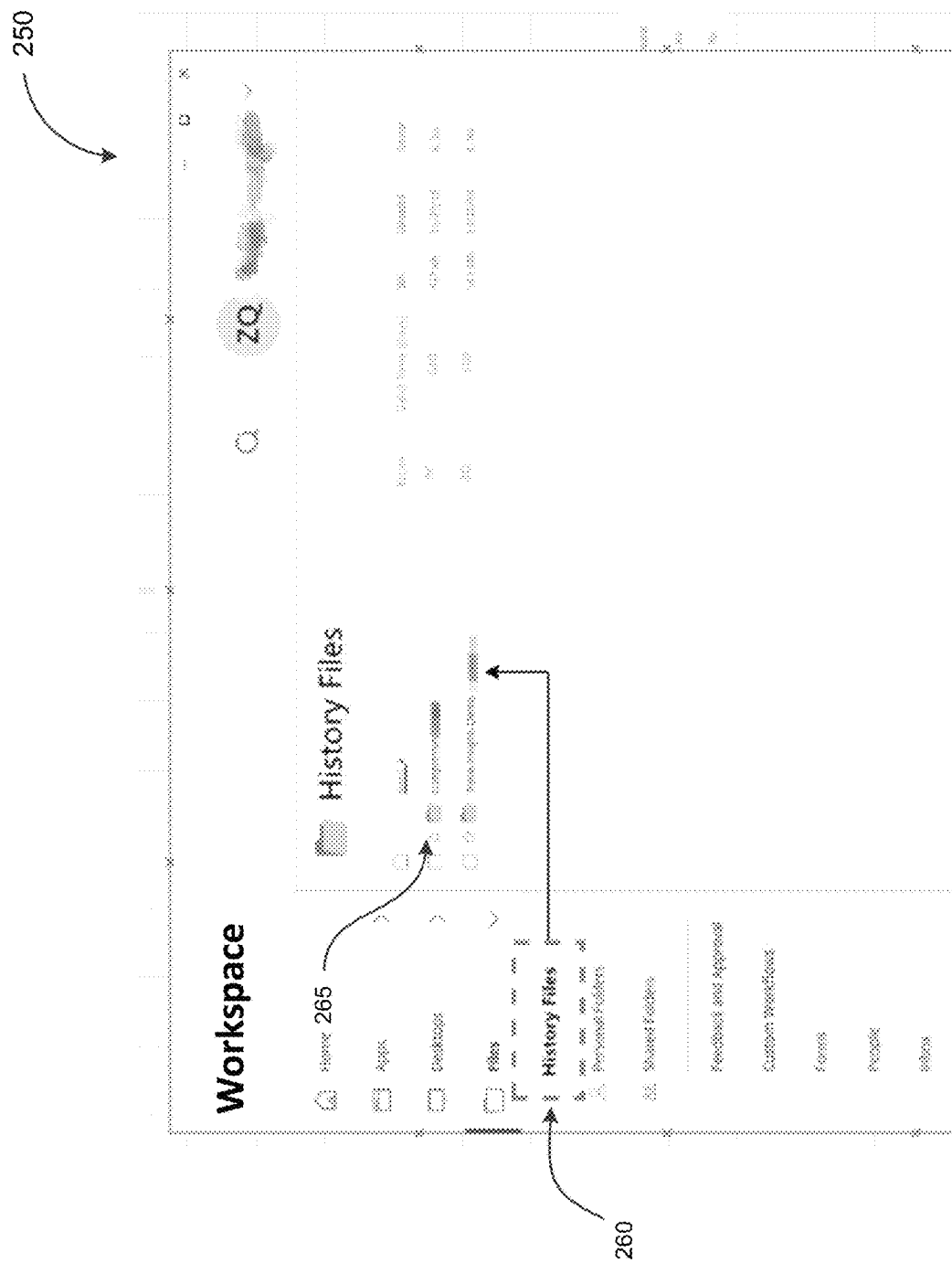
FIG. 2B depicts an example of a user interface, in accordance with some example embodiments.

By tracking the links received by the first user 145a, the tracking engine 120 may facilitate subsequent access to the links and the corresponding linked content. For instance, in some example embodiments, the tracking engine 120 may generate a user interface that displays, at the first client 140a associated with the first user 145a, the links received by the first user 145a. FIG. 2B depicts an example of a user interface 250, in accordance with some example embodiments. In the example shown in FIG. 2B, the user interface 250 may provide access to a file system including a directory 260 (e.g., a "History Files" directory) that form a part of a digital workspace. The directory 260 may be a directory that is designated for linked content. Accordingly, in response to the first user 145*a* accessing the directory 260, for example, by selecting the directory 260 shown in the user interface 250, the tracking engine 120 may update, based on the database table 200, the user interface 250 such that at least a portion of the linked content received by the first user 145*a* are displayed as part of the directory 260.

For instance, the tracking engine 120 may update, based at least on the database table 200, the user interface 250 to display, as part of the directory 260, a user interface element 265 associated with the link 155 and/or the file 115 associated with the link 155. The user interface element 265 may be a selectable user interface element (e.g., an icon, a checkbox, a radio button, and/or the like) that enables the first user 145*a* to access the file 115 by selecting the user interface element 265.

In some example embodiments, the tracking engine 120 may be configured to update the database table 200 associated with the first user 145*a* to indicate and/or remove one or more invalid links. For example, as noted, the link 155 the first user 145*a* received from the second user 145*b* may be valid for during a validity period, which may be a quantity of time (e.g., an n number of days, a start date, an expiration date, and/or the like) specified by the second user 145*b*. Alternatively and/or additionally, the link 155 may become invalid if the file 115 associated with the link 115 is no longer available at the location associated with the link 155, which may occur when the second user 145*b* removes the file 115 from its location (e.g., at a repository associated with the file sharing service 110 and/or the second client 145*b*).

Accordingly, as part of updating the database table 200, the tracking engine 120 may set an indicator (e.g., a Boolean value and/or the like) to a value that corresponds to whether the link 155 received from the second user 145 is valid. For example, the tracking engine 120 may set the indicator to a first value if the link 155 is determined to be valid and a second value if the link 155 is determined to be invalid. Alternatively, the tracking engine 120 may remove, from the database table 200, the link 155 received from the second user 145*b* if the tracking engine 120 determines that the link 155 is no longer valid.

The tracking engine 120 may update the database table 200 periodically in order to mark and/or remove links that have become invalid since a previous update. When the first user 145*a* accesses the directory 260 subsequent to an update of the database table 200, the directory 260 that is displayed as part of the user interface 250 may exclude, for example, the link 155 and/or the file 115 associated with the link 155 if the tracking engine 120 had marked the link 155 as invalid or removed the link 155 from the database table 200 during a previous update based on a determination that the link 155 is invalid. For instance, the user interface 250 may be updated to not display the user interface element 265 associated the link 155 and/or the file 115. Alternatively, the user interface 250 may be updated to render the user interface element 265 unselectable such that the first user 145*a* may no longer access the file 115 by selecting the user interface element 265. For example, the user interface element 265 may be grayed out to prevent the first user 145*a* from selecting the user interface element 265.

Figure 2C:
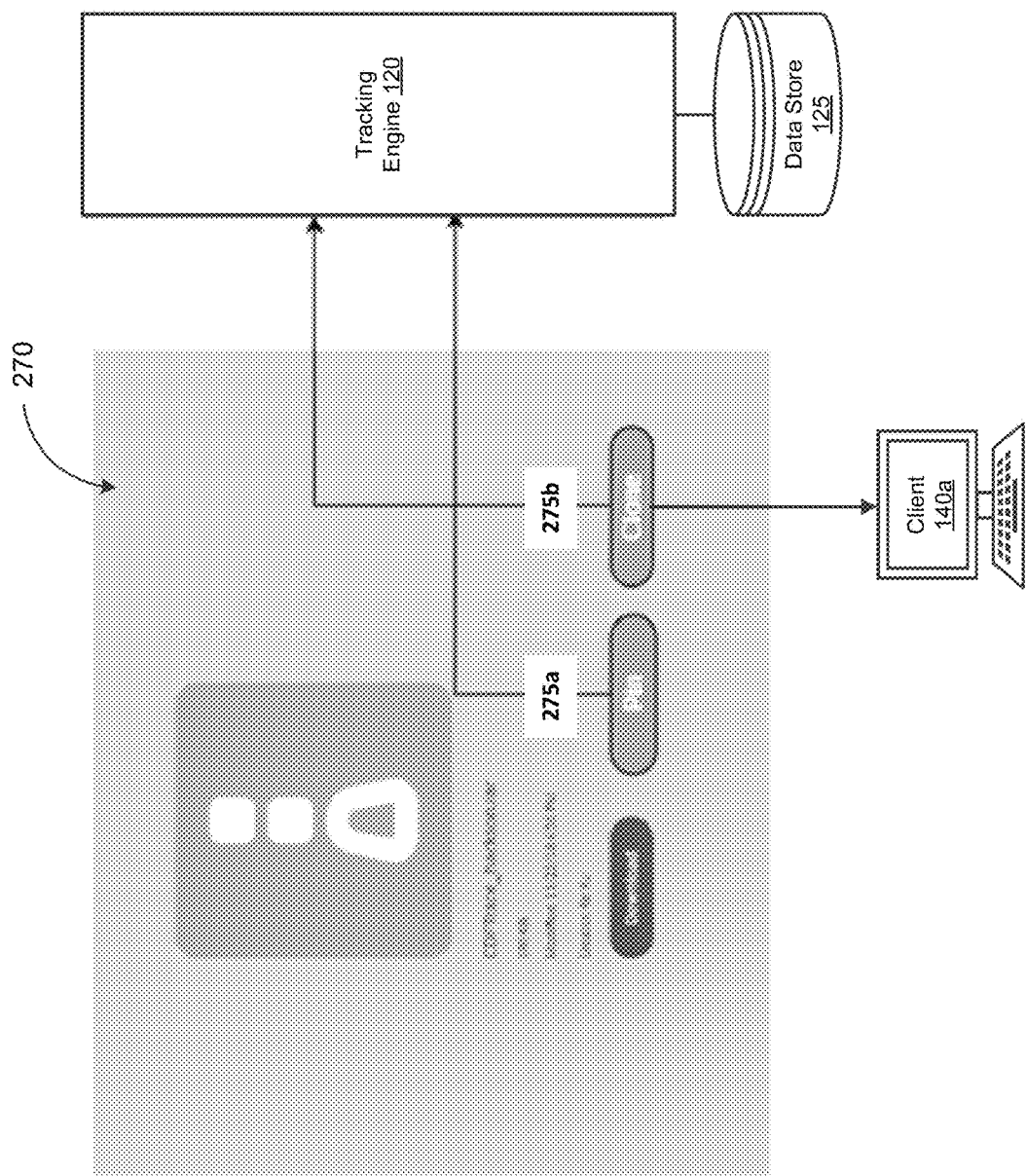
FIG. 2C depicts another example of a user interface, in accordance with some example embodiments.

In addition to tracking the link 155 received by the first user 145*a* by storing the link 155 in the database table 200 associated with the first user 145*a*, the tracking engine 120 may further generate, at the first client 140*a* associated with the first user 145*a*, a local copy of the file 115 associated with the link 155. For example, in some example embodiments, upon receiving the link 155 in the message 150 from the second user 145*b*, the first user 145*a* may select between pinning the link 155 or cloning the link 155. FIG. 2C depicts an example of a user interface 270 having a first user interface element 275*a* that the first user 145*a* may select to pin the link 155 and a second user interface element 275*b* that the first user 145*a* may select to clone the link 155.

In some example embodiments, the tracking engine 120 may generate the user interface 270 in response to the first user 145*a* receiving the message 150 including the link 155 to the file 115 associated with the file sharing service 110. The user interface 270, including the first user interface element 275*a* and the second user interface element 275*b*, may be displayed at the first client 140*a* in order to enable the first user 145*a* to select between pinning the link 155 or cloning the link 155. If the first user 145*a* requests to pin the link 155 by selecting the first user interface element 275*a*, the tracking engine 120 may store the link 155 in the database table 200. Alternatively, if the first user 145*a* requests to clone the link 155 by selecting the second user interface element 275*b*, the tracking engine 120 may generate, at the first client 145*a*, a local copy of the file 115 associated with the link 155 in addition to storing the link 155 in the database table 200.

To generate the local copy of the file 115 at the first client 140*a*, the tracking engine 120 may download, from the file sharing service 110, the file 115 and store the downloaded copy of the file 115 at the first client 140*a*. When the first user 145*a* subsequently accesses the directory 260 designated for linked content, the tracking engine 120 may populate the directory to include the file 115. However, instead of accessing the file 115 remotely via the file sharing service 110 when the first user 145*a* selects the user interface element 265 associated with the link 155 to the file 115, the first user 145*a* may access the local copy of the file 115 stored at the first client 145*a* when the first user 145*a* selects the user interface element 265. Moreover, the tracking engine 120 may remove, from the first client 140*a*, the local copy of the file 115 when the link 155 associated with the file 115 becomes invalid, for example, outside of the validity period specified by the second user 145*b*.

Figure 3:
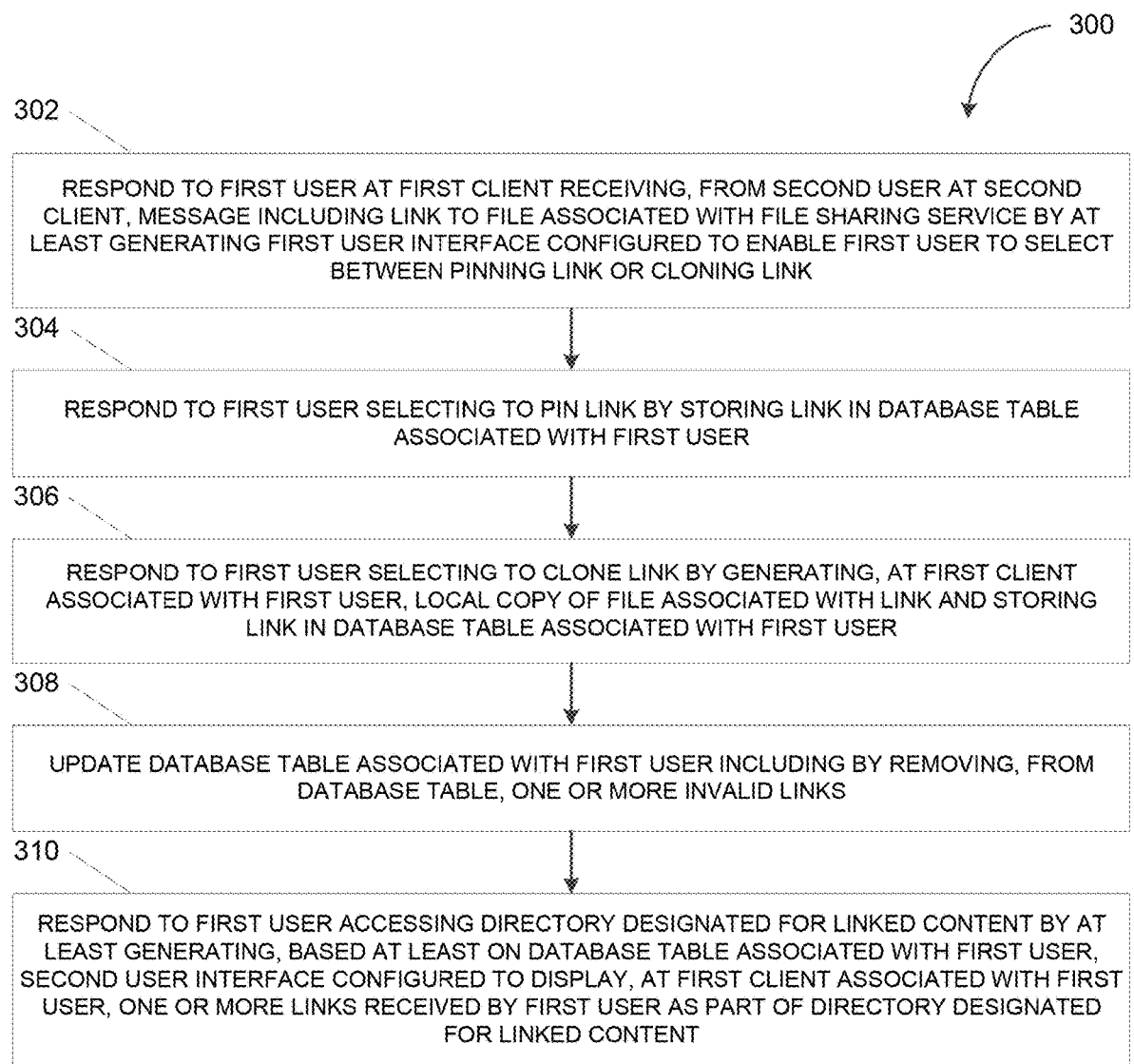
FIG. 3 depicts a flowchart illustrating an example of a process for tracking linked content from a file sharing service, in accordance with some example embodiments.

FIG. 3 depicts a flowchart illustrating an example of a process 300 for tracking linked content from a file sharing service, in accordance with some example embodiments. Referring to FIGS. 1, 2A-C, and 3, the process 300 may be performed by the tracking engine 120 in order to track linked content received by one or more users such as, for example, the first user 145*a* at the first client 140*a*.

At 302, the tracking engine 120 may respond to the first user 145*a* at the first client 140*a* receiving, from the second user 145*b* at the second client 140*b*, the message 150 including the link 155 to the file 115 associated with the file sharing service 110 by at least generating a first user interface configured to enable the first user 145*a* to select between pinning the link 155 or cloning the link 155. For example, the first user 145*a* at the first client 140*a* may receive, from the second user 145*b* at the second client 140*b*, the message 150, which may include the link 155 to the file 115 associated with the file sharing service 110. The file 115, which may be stored at a repository associated with the file sharing service 110 and/or the second client 140*b*, may be accessed through the file sharing service 110. Accordingly, the link 155 may direct the first client 140*a* to the file sharing service 110, which may respond by at least routing the first client 140*a* to the location at which the file 115 is stored.

In some example embodiments, the tracking engine 120 may respond to the first user 145*a* receiving the message 150 by generating, for example, the user interface 270. As shown in FIG. 2C, the user interface 270 may include the first user interface element 275a, which the first user 145a may select to pin the link 155. Furthermore, as shown in FIG. 2C, the user interface 270 may include the second user interface element 275b, which the first user 145a may select to clone the link 155.

At 304, the tracking engine 120 may respond to the first user 145a selecting to pin the link 155 by storing the link 155 in the database table 200 associated with the first user 145a. For example, in response to the first user 145a requesting to pin the link 155 by selecting the first user interface element 275a included in the user interface 270, the tracking engine 120 may store, in the database table 200 associated with the first user 145a, the link 155. As shown in FIG. 2A, storing the link 155 in the database table 200 may include storing a variety of information associated with the link 155 and the file 115 associated with the link 155 including, for example, an identifier of the file 115, a name of the file 115, a size of the file 115, a date the file 115 was uploaded to the file sharing service 110, a creator of the file 115, a validity period during which the link 155 is valid, a sender of the link 155, and/or the like.

At 306, the tracking engine 120 may respond to the first user 145a selecting to clone the link 155 by generating, at the first client 140a associated with the first user 145a, a local copy of the file 115 associated with the link 155 and storing the link 155 in the database table 200 associated with the first user 145a. For example, in response to the first user 145a requesting to clone the link 155 by selecting the second user interface element 275b included in the user interface 270, the tracking engine 120 may store, in the database table 200 associated with the first user 145a, the link 155. In addition to storing the link 155 in the database table 200, the tracking engine 120 may generate, at the first client 140a associated with the first user 145a, a local copy of the file 115. For instance, the tracking engine 120 may generate the local copy of the file 115 by at least downloading, from the file sharing service 110, the file 115 and storing the downloaded copy of the file 115 at the first client 140a. In doing so, when the first user 145a selects the user interface element 265 included in the user interface 200, the first user 145a may access the local copy of the file 115 stored at the first client 145a instead of a remote copy of the file 115 stored at a repository associated with the file sharing service 110 and/or the second client 140b.

At 308, the tracking engine 120 may update the database table 200 associated with the first user 145a including by removing, from the database table 200, one or more invalid links. For example, the tracking engine 120 may update the database table 200 to remove, from the database table 200, the link 155 if the tracking engine 120 determines that the link 155 has expired due to the expiration of the validity period associated with the link 155. Alternatively, the tracking engine 120 may update the database table 200 to remove, from the database table 200, the link 155 if the tracking engine 120 determines that the link 155 is no longer available at the location associated with the link 155. As noted, the file 115 associated with the link 115 may no longer be available at the location associated with the link 155 if the second user 145b removes the file 115 from that location (e.g., at a repository associated with the file sharing service 110 and/or the second client 145b).

At 310, the tracking engine 120 may respond to the first user 145a accessing a directory designated for linked content by at least generating, based at least on the database table 200 associated with the first user 145a, a second user interface configured to display, at the first client 140a associated with the first user 145a, one or more links received by the first user 145a as part of the directory designated for linked content. As shown in FIG. 2B, the tracking engine 120 may generate, based at least on the database table 200 associated with the first user 145a, the user interface 250 to provide access to the links received by the first user 145a. For example, the user interface 250 may include the directory 260, which may be a directory that is designated for linked content such as the link 155 and the corresponding file 115. Accordingly, in response to the first user 145a accessing the directory 260, for example, by selecting the directory 260 shown in the user interface 250, the tracking engine 120 may update, based on the database table 200, the user interface 250 such that at least a portion of the linked content received by the first user 145a are displayed as part of the directory 260. For instance, the tracking engine 120 may update the user interface 250 to include the user interface 250 associated with the link 155 and/or the corresponding file 115 are displayed as part of the directory 260. The user interface element 265 may remain selectable during the validity period of the link 155 such that the first user 145a may access the file 115 by selecting the user interface element 265.

Figure 4:
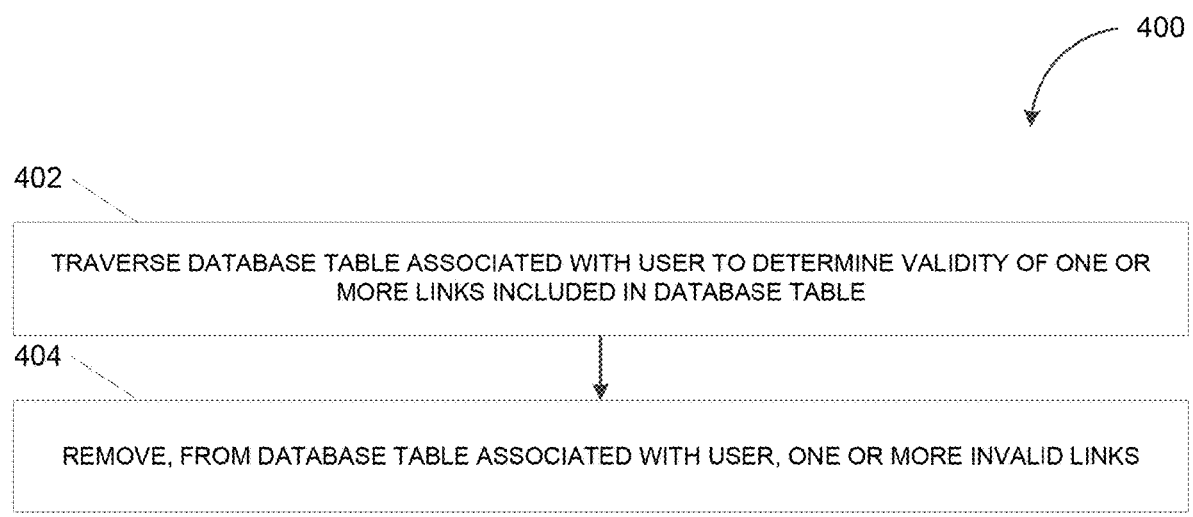
FIG. 4 depicts a flowchart illustrating an example of a process for updating a database table for tracking linked content, in accordance with some example embodiments.

FIG. 4 depicts a flowchart illustrating an example of a process 400 for updating a database table for tracking linked content, in accordance with some example embodiments. Referring to FIGS. 1, 2A-C, and 3-4, the process 400 may implement operation 308 of the process 300 and may be performed by the tracking engine 120 in order to update, for example, the database table 200 associated with the first user 145a.

At 402, the tracking engine 120 may traverse the database table 200 associated with the first user 145a to determine validity of one or more links included in the database table 200. The database table 200 associated with the first user 145a may, as noted, store one or more links sent to the first user 145a including, for example, the link 155 associated with the file 115 from the file sharing service 110. As shown in FIG. 2A, the database table 200 may store a variety of information associated with the link 155 and the file 115 associated with the link 155 including, for example, an identifier of the file 115, a name of the file 115, a size of the file 115, a date the file 115 was uploaded to the file sharing service 110, a creator of the file 115, a validity period during which the link 155 is valid, a sender of the link 155, and/or the like.

The link 155 may, as noted, be valid for a quantity of time (e.g., an n number of days, a start date, an expiration date, and/or the like) specified by the second user 145b. Moreover, the validity period during which the link 155 is valid may be in the database table 200. Accordingly, in some example embodiments, the tracking engine 120 may determine, based at least on the validity period of the link 155 included in the database table 200, whether the link 155 is valid. The tracking engine 120 may determine that the link 155 is invalid if, for example, the link 155 has expired. Alternatively and/or additionally, the tracking engine 120 may determine whether the link 155 is valid based at least on whether the file 115 associated with the link 155 is available at the location associated with the link 155. For example, the link 155 may be invalid if the file 115 associated with the link 115 is no longer available at the location associated with the link 155, which may occur when the second user 145b removes the file 115 from its location (e.g., at a repository associated with the file sharing service 110 and/or the second client 145b).

At 404, the tracking engine 120 may remove, from the database table 200 associated with the first user 145a, one or more invalid links. In some example embodiments, the tracking engine 120 may remove, from the database table 200, the link 155 if the tracking engine 120 determines that the link 155 is invalid. As noted, the tracking engine 120 may generate, based at least on the database table 200, the user interface 250 to display the directory 260, which may include the one or more links sent to the first user 145a. Accordingly, when the first user 145a accesses the directory 260 subsequent to an update of the database table 200, the directory 260 that is displayed as part of the user interface 250 may exclude, for example, the link 155 and/or the file 115 associated with the link 155 if the tracking engine 120 had removed the link 155 from the database table 200 during a previous update upon determining that the link 155 is invalid. For instance, the user interface 250 may be updated to not display the user interface element 265 associated the link 155 and/or the file 115. Alternatively, the user interface 250 may be updated to display the user interface 265 but without any selectability such that the first user 145a may no longer access the file 115 by selecting the user interface element 265.

Figure 5:
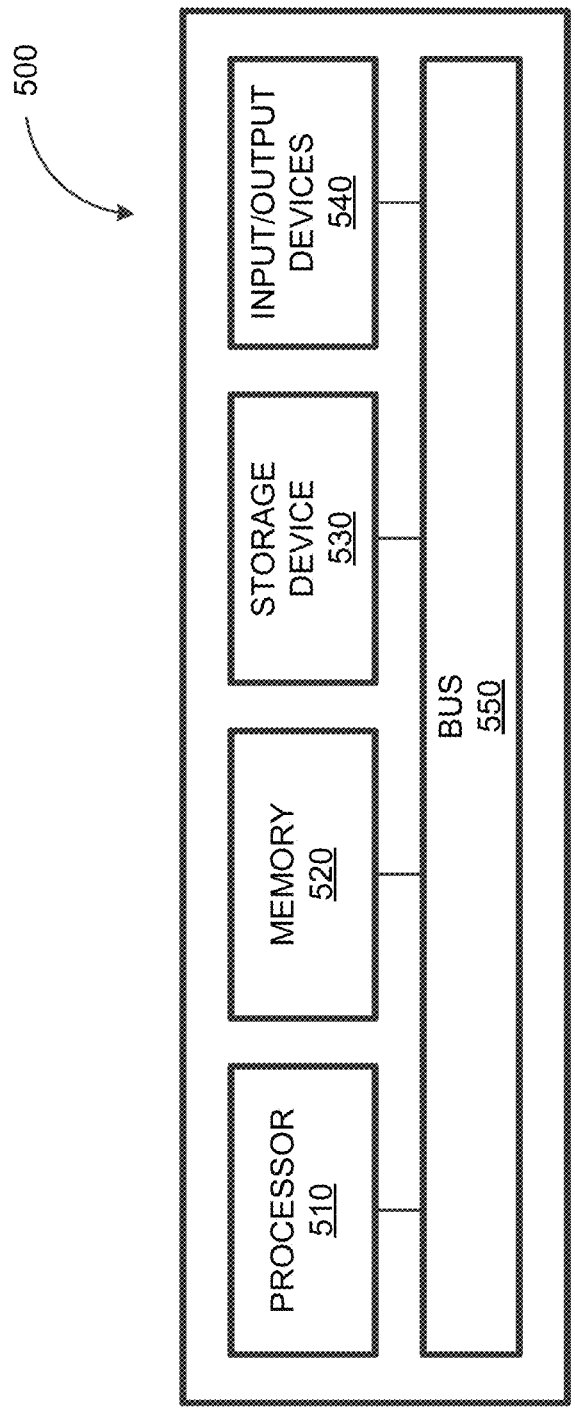
FIG. 5 depicts a block diagram illustrating an example of a computing device, in accordance with some example embodiments.

FIG. 5 depicts a block diagram illustrating a computing system 500 consistent with implementations of the current subject matter. Referring to FIGS. 1, 2A-C, and 3-5, the computing system 500 can be used to implement the file sharing service 110, the tracking engine 120, the first client 145a, the second client 145b, and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the file sharing service 110, the tracking engine 120, the first client 145a, and/or the second client 145b. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, cause the at least one data processor to at least:
        in response to a first user receiving, from a second user, a message including a first link to a first file associated with a file sharing service, generate a first user interface including a first user interface element for pinning the first link and a second user interface element for cloning the first link;
        in response to the first user requesting to pin the first link by selecting the first user interface element, store, in a database table associated with the first user, the first link;
        in response to the first user requesting to clone the first link by selecting the second user interface element, generate, at the client associated with the first user, a local copy of the first file in addition to storing the first link in the database table associated with the first user;
        traverse the database table to determine a validity of each link included in the database table;
        determine, based at least on the first file being unavailable at a location associated with the first link, that the first link is invalid;
        in response to determining that the first link is invalid, update the database table to indicate that the first link is invalid and remove, from the client associated with the first user, the local copy of the first file; and
        generate, based at least on the database table, a second user interface configured to provide, at a client device associated with the first user, access to one or more files associated with one or more valid links received by the first user, the second user interface further configured to prevent access to the first file associated with the first link based at least on the first link being invalid.

2. The system of claim 1, wherein the local copy of the first file is generated by at least downloading, from the file sharing service, the first file and storing the first file at the client.

3. The system of claim 1, wherein the local copy of the first file is accessed in response to the first user selecting the first link displayed as part of the second user interface.

4. The system of claim 1, wherein storing the first link in the database table includes storing, in the database table, an identifier of the first file, a name of the first file, a size of the first file, a date the first file was uploaded to the file sharing service, a creator of the first file, and a validity period during which the first link, and/or a sender of the first link.

5. The system of claim 1, wherein the at least one data processor is further caused to at least:
    update the database table by at least setting an indicator to indicate that the first link is invalid or removing the first link from the database table.

6. The system of claim 1, wherein the first link is determined to be invalid further based at least on an expiration of a validity period specified by the second user, and wherein the validity period corresponds to a quantity of time during which the first file is accessible to the first user.

7. The system of claim 1, wherein the one or more links displayed as part of the second user interface includes a second link based at least on the second link being valid, wherein the second user interface provides access to a second file associated with the second link by at least including an user interface element corresponding to the second link, and wherein the second file is accessed by selecting the user interface element.

8. The system of claim 1, wherein the second user interface prevents access to the first file associated with the first link by at least excluding the first link from the one or more links displayed as part of the second user interface.

9. The system of claim 1, wherein the second user interface prevents access to the first file associated with the first link by at least including an unselectable user interface element corresponding to the first link.

10. The system of claim 1, wherein the second user interface is generated in response to the first user accessing a directory, and wherein the one or more links received by the first user are displayed as part of the directory.

11. A computer-implemented method, comprising:
in response to a first user receiving, from a second user, a message including a first link to a first file associated with a file sharing service, generating a first user interface including a first user interface element for pinning the first link and a second user interface element for cloning the first link;
in response to the first user requesting to pin the first link by selecting the first user interface element, storing, in a database table associated with the first user, the first link;
in response to the first user requesting to clone the first link by selecting the second user interface element, generating, at the client associated with the first user, a local copy of the first file in addition to storing the first link in the database table associated with the first user;
traversing the database table to determine a validity of each link included in the database table;
determining, based at least on the first file being unavailable at a location associated with the first link, that the first link is invalid;
in response to determining that the first link is invalid, updating the database table to indicate that the first link is invalid and removing, from the client associated with the first user, the local copy of the first file; and
generating, based at least on the database table, a second user interface configured to provide, at a client device associated with the first user, access to one or more files associated with one or more valid links received by the first user, the second user interface further configured to prevent access to the first file associated with the first link based at least on the first link being invalid.

12. The method of claim 11, further comprising:
generating the local copy of the first file by at least downloading, from the file sharing service, the first file and storing the first file at the client; and
in response to the first user selecting the first link displayed as part of the second user interface, accessing the local copy of the first file.

13. The method of claim 11, further comprising:
updating the database table by at least setting an indicator to indicate that the first link is invalid or removing the first link from the database table.

14. The method of claim 11, wherein the second link is determined to be invalid further based at least on an expiration of a validity period specified by the second user, and wherein the validity period corresponds to a quantity of time during which the first file is accessible to the first user.

15. The method of claim 11, wherein the second user interface prevents access to the first file associated with the first link by at least excluding the first link from the one or more links displayed as part of the second user interface.

16. The method of claim 11, wherein the second user interface prevents access to the first file associated with the first link by at least including an unselectable user interface element corresponding to the first link.

17. A non-transitory computer readable medium storing instructions, which when executed by at least one data processor, result in operations comprising:
in response to a first user receiving, from a second user, a message including a link to a file associated with a file sharing service, generating a first user interface including a user interface element for pinning the link and a second user interface element for cloning the first link;
in response to the first user requesting to pin the link by selecting the user interface element, storing, in a database table associated with the first user, the link;
in response to the first user requesting to clone the first link by selecting the second user interface element, generating, at the client associated with the first user, a local copy of the first file in addition to storing the first link in the database table associated with the first user;
traversing the database table to determine a validity of each link included in the database table;
determining, based at least on the file being unavailable at a location associated with the link, that the link is invalid;
in response to determining that the link is invalid, updating the database table to indicate that the link is invalid and removing, from the client associated with the first user, the local copy of the first file; and
generating, based at least on the database table, a second user interface configured to provide, at a client device associated with the first user, access to one or more files associated with one or more valid links received by the first user, the second user interface further configured to prevent access to the file associated with the link based at least on the link being invalid.

* * * * *